July 11, 1950  C. NICHOLSON  2,515,017
PROCESS OF MAKING WAX NEGATIVE MOLDS
Filed Nov. 29, 1947
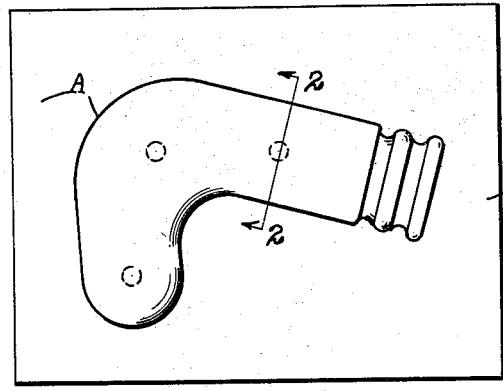
Fig. 1.
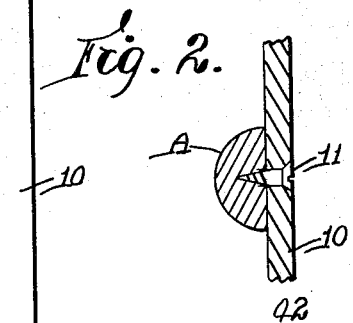
Fig. 2.
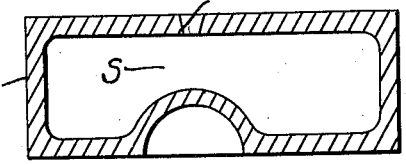
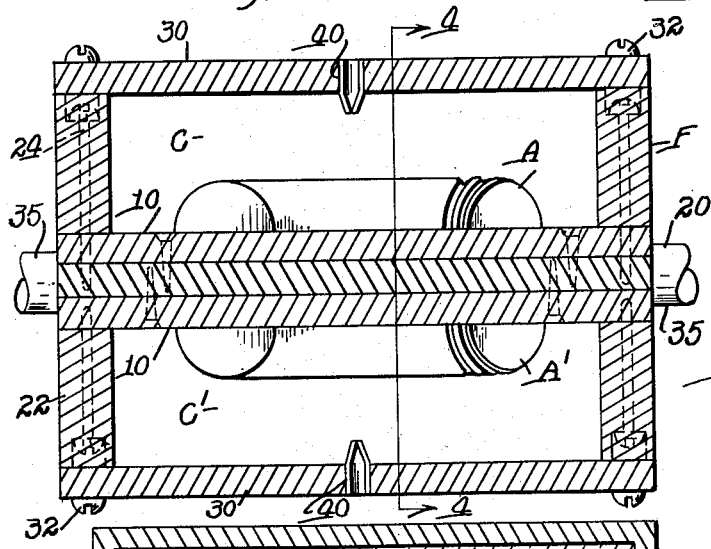
Fig. 3.
Fig. 4.
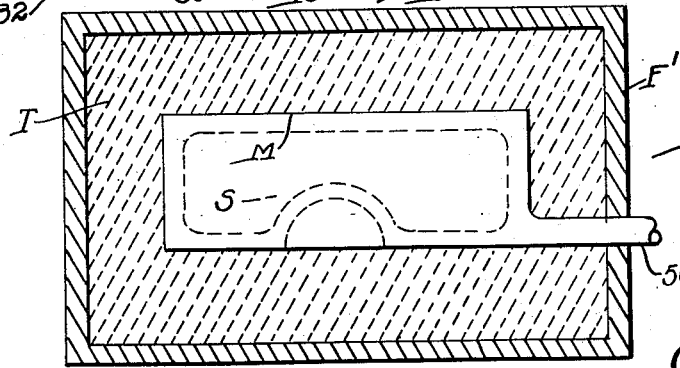
Fig. 5.
INVENTOR.
Celtic Nicholson.
BY Chas. P. Hawley
ATTORNEY Patented July 11, 1950

2,515,017

UNITED STATES PATENT OFFICE 2,515,017

PROCESS OF MAKING WAX NEGATIVE MOLDS

Celtic Nicholson, Leominster, Mass.

Application November 29, 1947, Serial No. 788,936

1 Claim. (Cl. 18—58.3)

This invention relates to wax molds used in the manufacture of metal dies which in turn are to be used in making plastic articles under pressure.

The previous practice has been to make a wax negative mold of the desired article, and to then make a positive mold from this negative mold in some material which is very hard and heat-resistant when compressed and baked. The wax negative mold is then removed from the positive mold by melting or burning out. The heat-resistant positive mold is then used in casting an exact reproduction of the wax negative mold in steel, bronze or other similarly durable material. This second and metallic negative mold is then used in the commercial manufacture of the desired plastic articles in quantity.

This method of making the second and metallic negative molds has not been found entirely satisfactory, as the wax of the first negative mold will expand under the baking heat used in making the positive and heat-resistant mold, and this expansion frequently distorts or cracks the positive mold during the baking operation.

It is the general object of the present invention to produce a wax negative mold so constructed that expansion of the mold under heat will be inward and harmless, instead of outward and harmful.

My invention further relates to certain ordered procedure which will be hereinafter described and more particularly pointed out in the appended claim.

My improved process of making a wax mold is illustrated in the drawings, in which Fig. 1 is a plan view showing one-half of a desired article mounted on a supporting plate;

Fig. 2 is a detail sectional view, taken along the line 2—2 in Fig. 1;

Fig. 3 is a sectional side elevation of a flask or casing having reversed plates similar to that shown in Fig. 1 mounted therein;

Fig. 4 is a transverse sectional view of a wax negative mold; and

Fig. 5 shows the wax negative mold mounted in a second flask for the production of the heat-resistant positive.

Referring to Figs. 1 and 2, I have shown a one-half portion A of an article which it is desired to reproduce in plastic material. This article portion A is secured on a plate 10 by screws 11. The plate 10 may be of metal or hard fibre or of any other suitable firm material.

Two plates 10 with reversed article portions A and A' are then secured to the opposite sides of a partition member 20, and rectangular hollow frames 22 are secured against the outer faces of the plates 10 by screws 24, thus forming compartments C and C' in a double flask F.

Each of these compartments is then partially filled with melted wax, after which covers 30 are secured in place by screws 32. The double flask F is then rotated to cause the wax to form a thick coating or shell over the articles A and A' and also on all interior surfaces of the compartments C and C'. The flask may conveniently be provided with gudgeons 35 on which it may be rotated and the rotation of the flask may continue for eight to ten minutes.

After the wax has thus formed a substantial coating or shell within the compartments C and C', air under pressure is forced into the interior of the compartments through nozzles 40 provided in the cover plates 30. The air is injected under substantial pressure, such as 15 to 20 pounds, and the hardening of the mold is accelerated if cold air is used.

A wax negative mold is thus formed in each compartment C and C', with each mold providing an exact negative reproduction of the desired article. A wax negative mold M thus produced is shown in section in Fig. 4, which also discloses the substantial air space S provided in each mold. The flask is then opened and the wax negative mold is removed from the flask and from the article, while the article is left in secured position in the flask for further reproduction.

The opening 42 formed by the nozzle 40 is then closed with wax and this wax negative mold is then placed in a second flask F' (Fig. 5) and is preferably provided with a wax gate 50. The flask F' is then filled with a suitable material T which is first firmly compressed and which is then baked until said material T becomes very hard and heat-resistant. A positive mold is thus formed.

During this baking process, any expansion of the wax will be into the space S, rather than outward, so that no distortion or damage of the positive mold will be produced.

After the material T has become sufficiently hard and heat-resistant, the temperature is increased to melt the wax mold M, and the melted wax will flow out through the opening left by the melting of the gate 50. Any remnants of remaining wax may then be burned out, and the positive mold is then ready for use in forming metallic reproductions of the negative mold M.

By thus providing an air space within the negative wax mold M, more accurate reproduction of the article A is made possible, and more intricate and delicate designs can be reproduced.

It will of course be understood that complete articles may be molded, if they do not present undercut contours, and it will also be noted that the use of a single flask F is optional.

Having thus described my invention and the advantages thereof, I do not wish to be limited to the details herein disclosed, otherwise than as set forth in the claim, but what I claim is:

The process of making a hollow wax negative mold for positive reproduction of a selected article which comprises providing a hollow flask, securing the selected article in a fixed position in said flask, partially filling the flask with hot wax, completely closing the flask to air-tight condition, giving the flask rotational movements for a substantial period of time to cause the wax to build up a substantial coating of wax on all interior wall surfaces of said flask and on said article, thereafter injecting air under pressure on the order of not less than fifteen pounds per square inch to the interior of said flask to harden the wax under said air pressure firmly against all exposed interior wall surfaces and against said article and to simultaneously provide an air space of substantial volume within said hollow wax negative mold, opening said flask, and removing the wax negative mold from the flask and from the article and leaving the article secured within the flask for further reproduction.

CELTIC NICHOLSON.

REFERENCES CITED

The following references are of record in the file of this patent:

UNITED STATES PATENTS

| Number | Name | Date |
|---|---|---|
| Re. 15,641 | Emery | July 3, 1923 |
| 519,438 | Smith | May 8, 1894 |
| 803,799 | Voelke | Nov. 7, 1905 |
| 1,373,121 | Emery | Mar. 29, 1921 |
| 1,506,062 | Henker | Aug. 26, 1924 |
| 1,659,399 | Faber | Feb. 14, 1928 |
| 1,876,229 | Herzog et al. | Sept. 6, 1932 |
| 2,346,784 | Pollack | Apr. 18, 1944 |